(12) United States Patent
Kazadi (10) Patent No.: US 9,702,573 B2
(45) Date of Patent: Jul. 11, 2017

(54) NESTED HEAT TRANSFER SYSTEM

(71) Applicant: Sanza T. Kazadi, Alhambra, CA (US)

(72) Inventor: Sanza T. Kazadi, Alhambra, CA (US)

( * ) Notice: Subject to any disclaimer, the term of this patent is extended or adjusted under 35 U.S.C. 154(b) by 391 days.

(21) Appl. No.: 14/572,707

(22) Filed: Dec. 16, 2014

(65) Prior Publication Data

US 2016/0091214 A1   Mar. 31, 2016

Related U.S. Application Data

(60) Provisional application No. 62/056,279, filed on Sep. 26, 2014.

(51) Int. Cl.
  *F25D 23/00* (2006.01)
  *F24F 3/147* (2006.01)
  *F25B 15/06* (2006.01)

(52) U.S. Cl.
  CPC ............. *F24F 3/147* (2013.01); *F25B 15/06* (2013.01); *Y02B 30/62* (2013.01)

(58) Field of Classification Search
  CPC   F24F 3/147; F25B 17/08; F25B 15/06; F25B 39/026; F28D 13/00; F28D 15/0266; Y02B 30/62
  See application file for complete search history.

(56) References Cited

U.S. PATENT DOCUMENTS

| 4,205,529 A | 6/1980 | Ko |
| 4,227,375 A | 10/1980 | Tompkins et al. |
| 4,373,347 A | 2/1983 | Howell et al. |
| 4,819,446 A | 4/1989 | Moore |
| 6,463,750 B2 | 10/2002 | Assaf |
| 7,938,888 B2 | 5/2011 | Assaf |
| 8,490,427 B2 | 7/2013 | Erickson |
| 2011/0162365 A1* | 7/2011 | Kazadi ............... F28D 15/0266 60/649 |

* cited by examiner

*Primary Examiner* — Elizabeth Martin (74) *Attorney, Agent, or Firm* — Invent Capture, LLC.; Samuel S. Cho (57) ABSTRACT

A novel nested heat transfer system comprises a plurality of chained enhanced entrochemical cells with nested structures. Each enhanced entrochemical cell includes a first chamber containing desiccant, or a higher concentration solution, and a second chamber containing refrigerant, or a lower concentration solution. Preferably, the first chamber and the second chamber are connected by a conduit. Furthermore, a smaller chamber in an enhanced entrochemical cell is encapsulated by a larger chamber in an adjacent enhanced entrochemical cell, thus forming a nested structure between the two enhanced entrochemical cells. A chain of enhanced entrochemical cells with a plurality of such nested structures is conveniently modular and scalable. For the novel nested heat transfer system, the total systemic thermal gradient is the sum of individual thermal gradients and capacity of individual enhanced entrochemical cells. This design provides highly-versatile and high-capacity refrigeration and thermal transfer systems, while exhibiting an elegant design simplicity.

14 Claims, 3 Drawing Sheets

NESTED HEAT TRANSFER SYSTEM

RELATED APPLICATIONS

This patent application claims priority to a U.S. provisional application, U.S. 62/056,279, filed on Sep. 26, 2014

FIELD OF THE INVENTION

The present invention relates to thermal transfer systems. In particular the present invention relates to an encapsulated chain of entrochemical cells that enable formation of a unique structure called the nested heat transfer system.

BACKGROUND OF THE INVENTION

Industrial thermal processes involving a cooling substance called the "refrigerant" that transfers heat to a heat-absorbing substance, called the "absorbent," have been utilized since the $18^{th}$ century. Various published patent documents, including U.S. Pat. Nos. 8,490,427, 7,938,888, 6,463,750, 4,819,446, 4,205,529, 4,227,375, and 4,373,347, describe using desiccant in either liquid or solid forms for the absorption of the vapor state of a liquid or solid substance that has a substantial vapor pressure. The vapor absorption encourages the refrigerant to evaporate further, thus generating a cooling of the refrigerant. The desiccant's absorption of vapor is generally exothermic, which has the effect of heating the desiccant. This effect can be used to generate a cooling effect, a heating effect, or both.

By 1810, a process utilizing sulfuric acid to cool water had been developed. This process worked by absorbing water vapor contained in a closed evacuated chamber when both water and sulfuric acid were separately contained within the same chamber. This conventional process results in evaporation of vapor from a pool of water, eventually generating ice at the surface of the water. By 1859, water and ammonia were utilized together for a similar effect, and by 1860, this thermal transfer process was patented. This classical invention for thermal transfer from the $19^{th}$ century enabled the development of an ice-making industry and refrigerated food storage in modern civilization.

During the 1950's, lithium bromide (LiBr) was introduced in the absorption refrigeration industry, as it had several advantages over the ammonia/water cycle. Advantages included non-volatility of LiBr and the ability to pump the solution with liquid pumps rather than gas pumps. By 1956, double stage LiBr-based absorption refrigerators had been developed. Today, multiple-stage absorption refrigerators have been developed by utilizing the same design principle used in the double stage design from the 1950's.

In all conventional cases described above, a low temperature liquid or solid refrigerant generates a vapor, which is absorbed by a desiccant at another temperature. Several conventional devices may be able to utilize the cool refrigerant in the absorption of heat from another source, such as a stream of air passing through a room, duct, or other enclosed area. This is used for air conditioning or refrigeration. Once the desiccant is at least partially saturated with absorbed refrigerant, the desiccant generally becomes unusable. As a result, the desiccant must be regenerated, or separated from the refrigerant. As all conventional refrigeration devices utilize a closed system, they necessitate a heat transfer into the system, which drives the refrigerant from the desiccant. The heat carried away with the refrigerant is then rejected, enabling the refrigerant to recondense and be used again.

At least one device described in U.S. Pat. No. 4,227,375 utilizes the heat generated from the absorption of vapor as a method of obtaining thermal energy. This is a form of chemical energy obtained by the adsorption of water by the desiccant. Storage of the dry desiccant enables the device described by U.S. Pat. No. 4,227,375 to effectively store energy in a convenient and stable form.

An important aspect of the absorption-style refrigeration is that the cooling obtained is a non-equilibrium process. The cooling is obtained when the vaporized refrigerant is absorbed, thus generating vaporization of more liquid or solid refrigerant. In absorption refrigerators, the latent and enthalpy-associated heat is rejected to an intermediate-temperature reservoir, which enables a continual absorption of heat and vapor by the desiccant. As a result, the system is typically operated out of chemical and thermodynamic equilibrium. This ensures rapid heat transfer and maximal cooling.

The need to simultaneously keep the desiccant active and to operate at low temperatures require the cool and concentrated desiccant to be continually pumped into the absorption chamber in practice. Furthermore, it is also necessary to continually pump the warmer dilute desiccant into the regenerator. Because the desiccant is a very hygroscopic substance, a much higher temperature heat than the intermediate temperature (i.e. at which the heat is rejected) must be utilized to vaporize the refrigerant either absorbed or adsorbed by the desiccant. Therefore, the absorption refrigeration system typically includes at least three different temperature regimes.

In addition, as mentioned previously, there are absorption refrigerators that utilize multiple stages. One such device is disclosed in U.S. Pat. No. 8,783,053. These multi-stage devices utilize high temperature heat sources, much like single stage devices. The heat rejected from the regenerator of the first stage is used to drive a second stage regenerator. This results in a lower thermal input and a higher coefficient of performance (COP) value. However, the addition of the second stage or any subsequent stages increases the system complexity, as the multiple stages need to be operated at differing operational pressures.

The conventional multiple stage designs are used to drive the desiccant used in the absorption to a continually lower water content, thereby enabling both quicker thermal transfers and more effective cooling. However, the conventional multiple stage designs are not able to increase the overall thermal gradient between the desiccant and the refrigerant as a linear or superlinear function of the number of stages. Therefore, the maximal thermal gradient is still limited to that generated between a completely dry desiccant or desiccant solution and the refrigerant in a completely closed container filled only with vaporized refrigerant.

In 2010, the inventor of the present invention, Dr. Sanza T. Kazadi, and other researchers disclosed a design for a cooling device based on an innovative entrochemical cell. The entrochemical cell has some similar physical characteristics to the absorption refrigerator. Each entrochemical comprises two closed chambers in vapor communication with one-another, and are arranged in a manner to ensure that the combined system is hermetically sealed in operation. Preferably, one chamber contains a desiccant while the other chamber contains a refrigerant.

However, unlike the absorption refrigerator, the entrochemical cell is operated at or near chemical and thermodynamic equilibrium. The two solutions contained by the entrochemical cell can only obtain chemical equilibrium when their temperatures are different. As a result, the two chambers settle to different temperatures. In an efficiently-insulated entrochemical cell, the temperature gradient may be maintained for days or weeks.

The table below demonstrates equilibrium thermal gradients in an entrochemical cell when one cell contains distilled water and the other contains a saturated solution of the indicated salt or salt combination.

| Solute | ΔT ° C. (±0.5° C.) |
|---|---|
| NaCl | 3 |
| $MgSO_4$ | 1 |
| NaCl + $MgSO_4$ | 4 |
| $KNO_3$ | 1.5 |
| $KNO_3$ + NaCl | 4 |
| $NaNO_3$ | 5 |
| KCl | 1.5 |
| $NaNO_3$ + KCl | 7 |

In the table above, the thermal gradient between an entrochemical cell's chambers at equilibrium is shown, when a first chamber is filled with distilled water and a second chamber is filled with the indicated salt or salt combination.

These experiments, documented by Kazadi et. al., involved placing a water/salt solution in the first chamber and distilled water in the second chamber, and then measuring the temperature after the system comes to equilibrium. It was demonstrated that, when the entrochemical cell was evacuated in order to generate a rarified atmosphere near the vapor pressure of the liquid inside, the two water solutions generated a thermal gradient that could be sustained for hours to weeks if properly insulated. Moreover, if the resulting dilute salt solutions are removed from the chambers, they can be dried in air and reused. While this last property may be quite appealing in some cases, as it eliminates the need for a regenerator using high temperature heat, the thermal lift of the various solutions remains undesirably low.

When operated at or near chemical equilibrium, a single absorption cell responds to perturbations or thermal leakage, which tends to bring the refrigerant and desiccant temperatures closer to one-another, by evaporation of the refrigerant and absorption of vapor by the desiccant. The evaporation process can be quite energetic, generating winds with speed of several miles per hour inside the cell, depending on the particular geometry of the cell. As a result of this evaporation, the amount of leakage or perturbation a cell can effectively respond to is limited. The refrigerant is eventually exhausted and must be replaced. In a closed system, this is accomplished using a regenerator as with conventional systems. In an open system, this is accomplished by simply adding more refrigerant.

Much of the present research on absorption refrigerators is focused on generating new chemical compounds that can function in the refrigerator while avoiding problems such as crystallization, clogging, or corroding the mechanical parts of the device, etc. This is necessary because of the dual problem of finding a desiccant that can be regenerated at low temperature and can simultaneously enable a large thermal gradient. However, if the design enabled the individual cells to reject heat into one another to make the warmer part of one cell in its chemical equilibrium state with differing chamber temperatures identical in temperature to the colder chamber of the next cell, the overall thermal gradient may be increased dramatically. Conventional absorption refrigerator have not been able to achieve such desirable characteristics.

Therefore, an innovative design that enables the use of much less chemically active desiccants that are commonly available and inexpensive, such as NaCl, may be highly desirable.

Kazadi et. al. has previously disclosed a two-stage device in which a NaCl plus water solution was used in a first chamber and a distilled water solution was used in a second chamber. While this design seemed to provide superlinear performance with a one-chamber thermal lift of 2.5° C. and a two-chamber thermal lift of 5.7° C., the design could not be extended to three stages. Moreover the design did not employ the nested heat transfer system of the present invention.

When the refrigerant condenses in or on the desiccant, the desiccant surface becomes covered with water. This can have the effect of shielding the interior of the desiccant from additional water absorption or adsorption. As a result, when working with pooled liquid desiccants, it is necessary to mix the desiccant to restore the desiccant concentration at the surface of the water. This can be accomplished by a variety of means, including adding a physical mixer, sloshing the cell, or utilizing the thermal energy in the vapor flow between the two chambers to drive a mechanical mixing system. This functionality has not been previously disclosed due to the vastly different nature of conventional absorption refrigerator design.

Therefore, it may be desirable to devise an absorption refrigeration device which operates in chemical equilibrium and can additively combine the thermal lift of multiple cells with independent desiccant and refrigerant equilibria, enabling the use of many different desiccants with limited thermal gradients and associated thermodynamic properties.

In conventional LiBr type absorption refrigerators, both the desiccant and the refrigerant are sprayed into a chamber using atomizers or similar systems for creating very small droplets. This increases the surface area, enabling quicker absorption of water vapor by the desiccant and evaporation of water from the refrigerant droplets. However, this requires the use of at least two fluid pumps and two atomizers. These additional elements add to the complexity of the absorption refrigerator. Therefore, it may also be desirable to devise a novel device that reduces design complexity exhibited in conventional absorption refrigerator designs, while providing a good desorption and absorption efficiency.

Furthermore, it may also be desirable to provide a novel device that utilizes an absorption and desorption process between a desiccant and a refrigerant that functions to establish, maintain, and return to a chemical equilibrium state, consequently creating and maintaining a thermal gradient. In addition, it may also be desirable to provide a novel device that allows a plurality of individual cells to perform their absorption and desorption independently to achieve an overall thermal gradient greater than that of an absorption and desorption reaction within a single cell, thereby enabling an expansion of the range of desiccants available for absorption refrigeration and related thermal processes.

Moreover, it may also be desirable to devise a system that accommodates an additive use of a desiccant for achieving a substantially larger thermal gradient than that of a single stage device, and does not require water pumps, atomizers, or other tools to provide sufficient interaction between the water vapor and either the desiccant or the refrigerant. Furthermore, it may be desirable to provide a mixing method required to achieve a high performance for the entrochemical cell. In addition, it may also be desirable to increase the surface area interface between the vapor and the desiccant.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a nested heat transfer system is disclosed. This nested heat transfer system comprises: a first enhanced entrochemical cell that includes a first chamber containing a first set of higher concentration solution, a second chamber containing a first set of lower concentration solution, a first conduit connecting the first chamber and the second chamber, a first mixing apparatus configured to agitate the first set of higher concentration solution, and a first set of valves operatively connected to the first chamber and the second chamber; and a second enhanced entrochemical cell that includes a third chamber containing a second set of higher concentration solution, a fourth chamber containing a second set of lower concentration solution, a second conduit connecting the third chamber and the fourth chamber, a second mixing apparatus configured to agitate the second set of higher concentration solution, and a second set of valves operatively connected to the third chamber and the fourth chamber, wherein the second chamber containing the first set of lower concentration solution at least partially encapsulates the third chamber containing the second set of higher concentration solution to form a nested structure, and wherein each enhanced entrochemical cell is individually hermetically sealed.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble apparatuses and/or supports which are associated with or parts of a nested heat transfer system. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the Specification are not necessarily all referring to the same embodiment. Furthermore, separate or alternative embodiments are not necessarily mutually exclusive of other embodiments.

In one embodiment of the invention, an apparatus capable of amplifying the cooling and/or heating effect of a single stage of desiccant-mediated thermal transfer is disclosed. This apparatus comprises multiple individual entrochemical cells. Each cell further comprises two chambers connected by a conduit, which enables vapor to travel naturally between the two chambers. Furthermore, each chamber has at least one opening, sealed by at least one valve, through which solution can be deposited in the chamber. The entire apparatus is hermetically sealed so that a rarified atmosphere can be created and maintained within. In a preferred embodiment of the invention, a first chamber containing the more concentrated solution is designated as "Chamber 1," and a second chamber containing the less concentrated solution is designated as "Chamber 2."

For drawing element labeling purposes, the first digit in each drawing element label signifies an entrochemical cell number. For example, in FIG. 1, the first digit "1," in each of the drawing element labels (e.g. 11, 12, 13, 14, 15, 16) signifies that a particular drawing element is part of the first entrochemical cell, or "Cell 1." Because FIG. 1 only shows one entrochemical cell (i.e. Cell 1), the first digit in each drawing element label is "1." In another example, in FIG. 2, there are two entrochemical cells (i.e. Cell 1, Cell 2) with one chamber from each entrochemical cell forming a nested structure. Therefore, some drawing element labels in FIG. 2 have the first digit as "1," while other drawing element labels have the first digit as "2."

Figure 3:
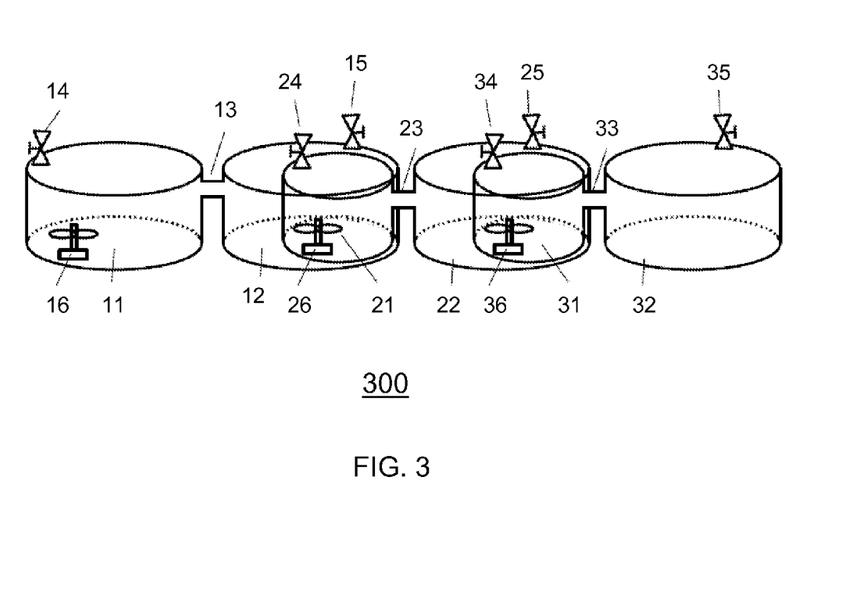
FIG. 3 shows three enhanced entrochemical cells with two pairs of nested chambers, in accordance with an embodiment of the invention.

Likewise, in case of FIG. 3, there are three entrochemical cells (i.e. Cell 1, Cell 2, Cell 3) with two nested structures, wherein the first nested structure is between Cell 1 and Cell 2, and the second nested structure is between Cell 2 and Cell 3. Therefore, some drawing element labels in FIG. 3 have the first digit as "1," while other drawing element labels have the first digit as "2" or "3." Similarly, in case of FIG. 4, there are n-number of entrochemical cells (i.e. Cell 1, Cell 2, Cell 3, ..., Cell n) with "n−1" number of nested structures (i.e. Nested Structure 1, Nested Structure 2, ..., Nested Structure (n−1)), wherein Nested Structure 1 is between Cell 1 and Cell 2, Nested Structure 2 is between Cell 2 and Cell 3, and Nested Structure (n−1) is between Cell (n−1) and Cell n. Therefore, some drawing element labels in FIG. 4 have the first digit as "1," or "2," while other drawing element labels have the first digit as "n−1," or "n."

Figure 2:
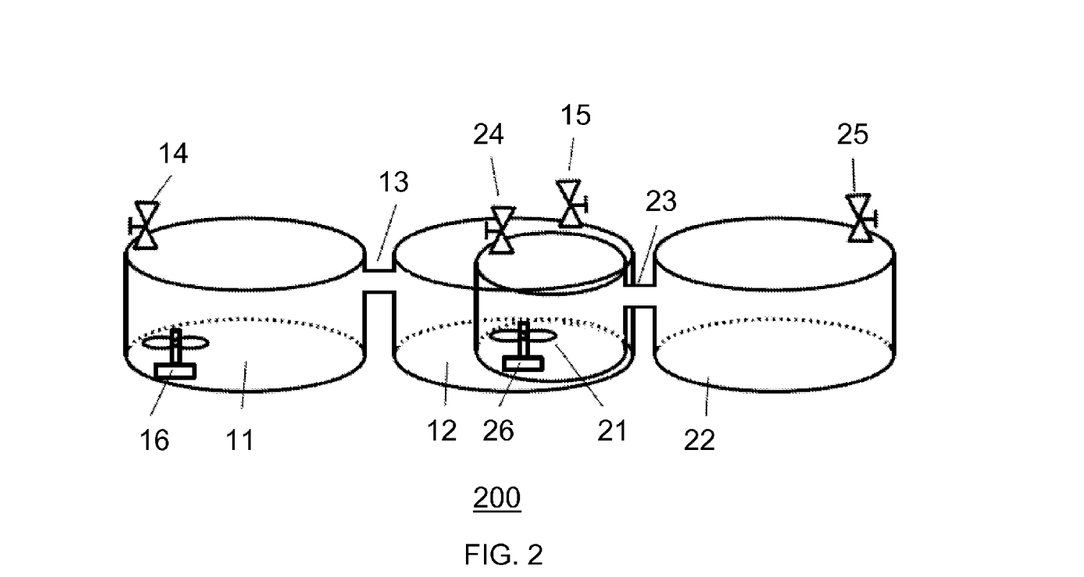
FIG. 2 shows two enhanced entrochemical cells with a pair of nested chambers, in accordance with an embodiment of the invention.
Figure 4:
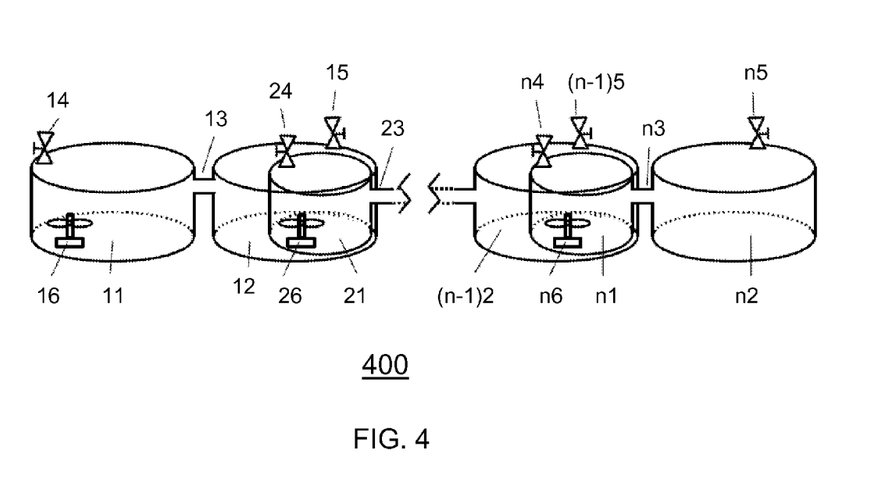
FIG. 4 shows an n-cell long array of nested enhanced entrochemical cells, in accordance with an embodiment of the invention.

As shown in FIGS. 2-4, in the preferred embodiment of the invention, each entrochemical cell is uniquely arranged so that nested structures are formed by two adjacent entrochemical cells by at least partially encapsulating a smaller chamber from one of the two adjacent entrochemical cells by a larger chamber from the other of the two adjacent entrochemical cells. Each nested structure is in thermal communication using a thermally conductive material. In this way, the entrochemical cells are arranged linearly and the temperature of Chamber 2 (i.e. lower concentration solution chamber) of one cell is significantly close to the temperature of Chamber 1 (i.e. higher concentration solution chamber) of the next cell. Therefore, if the temperature gradient of one cell is ΔT (t), where it is understood that the temperature gradient of each cell is itself temperature dependent, the overall temperature gradient of the total unit is $$\Delta T_{total} = \sum_{i=1}^{n} \Delta T(t_i)$$

Furthermore, in the preferred embodiment of the invention, each entrochemical cell may be enhanced for higher efficiency and performance. For example, Chamber 1 of each entrochemical cell is equipped with a method of mixing the solution. This enables the absorbed vapor, which tends to pool at the top of the solution, to fully mix in the desiccant-solution.

The novel nested heat transfer system, as disclosed in various embodiments of the present invention, shares some similarities with conventional absorption refrigeration, but also exhibits significant differences. In both technologies, the operational physical quality is the deliquescence of the draw solution that tends to absorb the refrigerant. However, in conventional absorption refrigeration, the system is operated to maximize the ability of the desiccant solution to absorb water. As a result, in conventional absorption refrigeration, the desiccant either becomes warm, which generates a heating effect, or the refrigerant becomes cold, which generates a cooling effect, or both. The heating effect is caused by the exothermic nature of the chemical reaction that occurs when a desiccant adsorbs the water. The cooling effect is caused by the cooling of the liquid that occurs as a result of the vaporization of the refrigerant. Conventional absorption refrigeration does not ever teach that the equilibrium state generates a usable thermal gradient, a notion that is uniquely and cleverly utilized in various embodiments of the present invention. Instead of building structures to maintain a system as far out of equilibrium as possible to cool or heat as quickly as possible, which are commonly practiced in conventional systems, entrochemical systems disclosed in various embodiments of the present invention incorporate elegantly minimal structures, such as two pools of liquid held at their entropic equilibrium point, which generates a departure from thermal equilibrium.

Because liquid solutions are maintained as closely as possible to entropic equilibrium despite thermal leakage in the nested thermal transfer system of the present invention, such a simplified and unique structural design is possible. In contrast, conventional refrigeration systems require more complexity because they require keeping solutions out of equilibrium, thus necessitating work done on the solutions to prevent the conventional refrigeration systems from reaching an equilibrium. For instance, in conventional absorption refrigerators, three operational temperatures are typically required. The first operational temperature is a colder temperature of the refrigerant, the second operational temperature is the room temperature, at which the heat generated by adsorption of water is rejected, and the third operational temperature is a hotter temperature, at which the absorbent is regenerated and separates water from it. These conventional refrigeration systems require a constant influx of thermal energy to maintain the high temperature and a separate heat sink at room temperature to maintain the middle temperature.

In contrast, utilizing a system at equilibrium requires only two operational temperatures in various embodiments of the present invention: a colder operating temperature, and a hotter operating temperature. Moreover, a nested heat transfer system in accordance with an embodiment of the present invention is capable of maintaining the thermal gradient without an influx of any thermal energy. The thermal energy can be moved spontaneously from one part to another part of the nested heat transfer system. Furthermore, the only energy required to maintain this equilibrium point is mechanical energy used to mix the higher absorbent solution, and this mechanical energy can be derived from the dynamics of the thermal energy transfer from one part to another, as further described in detail below.

Conventional absorption refrigeration typically lacks multiple-stage systems that operationally connect a lower-temperature refrigerant to a hotter desiccant in a second stage. Instead, conventional multiple-stage systems are merely designed to enhance the regeneration of the desiccant by running the same thermal energy that drives the regeneration through multiple stages, thus generating a new yield at each stage. The conventional multi-stage refrigeration systems are therefore fundamentally different from the present invention's direct thermal connection between the cooler refrigerant and the hotter desiccant, because the conventional multi-stage refrigeration systems do not increase the overall thermal gradient. Rather, the conventional multi-stage refrigeration systems extend the possible thermal gradient in a single stage to its maximum capability, when a completely dry desiccant and the refrigerant are utilized.

In contrast, the stacking method in accordance with an embodiment of the invention, which is further described below, is capable of extending the cooling or heating process well beyond the single stage limit and is capable of utilizing multiple desiccants and refrigerants, as each entrochemical cell is independent and hermetically sealed from each other. This novel and unique ability to expand the thermal gradient and capacity makes the entrochemical cell-nested thermal transfer system of the present invention capable of cooling to much colder temperatures than conventional absorption refrigerators. Similarly, the scalable and expandable thermal gradient and capacity of the entrochemical cell-nested thermal transfer system of the present invention enable heating to much hotter temperatures than conventional absorption refrigerators.

For example, an entrochemical cell-nested thermal transfer system with $CaCl_2/H_2O$ refrigerant and absorbent solutions, in accordance with an embodiment of the invention, has shown laboratory measurements of thermal gradients in excess of their approximate single stage limit of 13° C., with temperatures as high as 30° C. It is equally feasible to provide cooling as much as 120° C. and heating with a great thermal lift, with desiccants such as LiBr or $ZnCl_2$. Conventional absorption refrigerators are unable to provide such a large thermal lift.

One aspect of an embodiment of the present invention is partially or completely embedding (i.e. "nesting") a higher temperature chamber of an entrochemical cell in a lower temperature chamber of an adjacent entrochemical cell, or vice versa, to transfer thermal energy between the two nested chambers at high (i.e. near-maximum possible) efficiency. Thermal energy losses are nearly nonexistent or minimal in this nested chamber structure involving at least two entrochemical cells, because heat is directly transferred from one chamber to the next within the hermetically-sealed nested structure. Furthermore, the nested structure of chambers may be configured to maximize contact surface area, which optimizes the rate of energy transfer and the work done within the nested heat transfer system.

In one embodiment of the invention, the novel inclusion of a mixing apparatus is important for an efficient transfer of energy from one entrochemical cell to an adjacent entrochemical cell. Without this mixing apparatus, a film of lower concentration liquid can form on the surface of the high chemical activity solution. As thermal energy is transferred due to the difference in liquid concentrations at the contacting surface of the nested chambers, the formation of the lower concentration liquid film may inhibit thermal transfer. The mixing apparatus prevents or breaks up the lower concentration liquid film by agitating the desiccant, especially near the contacting surface of the nested chambers, thus protecting or restoring the thermal energy transfer capacity. The mixing apparatus may be incorporated inside a chamber as an internal unit, or may be designed as an external unit to shake or vibrate the entire chamber structure.

In a preferred embodiment of the invention, an elegantly simple mixing apparatus comprises a magnetic mixing bar contained inside Chamber 1 (i.e. higher concentration solution chamber) of each entrochemical cell, and an externally-located magnetic mixing unit in each entrochemical cell. As the externally-located magnetic mixing unit spins its magnet to change magnetic fields, the magnetic mixing bar inside Chamber 1 correspondingly spins, thus mixing the internal solution in Chamber 1.

In another embodiment of the invention, another type of mixing apparatus is an external unit that can shake or agitate one or more chambers in the nested structure to induce a sloshing movement of the liquids contained in the chambers. The external unit-induced sloshing movement provides efficient mixture and homogenization of each solution, thus restoring thermal transfer characteristics that may have been reduced or distorted due to the undesirable film formation.

Yet in another embodiment of the invention, another type of mixing apparatus utilizes the transfer of thermal energy between chambers to mix the higher concentration solution. As the two solutions of different concentrations have differing equilibrium vapor pressures, the two chambers react to perturbations in the vapor pressure differently. The higher concentration solution tends to absorb excess vapor, while the lower concentration solution tends to generate new vapor when the vapor pressure drops. This imbalance in pressures between the chambers drives the vapor from Chamber 2 (i.e. lower concentration solution chamber) to Chamber 1 (i.e. higher concentration solution chamber). If the vapor pathway from Chamber 2 to Chamber 1 is terminated by a vertical tube, wherein the vertical tube is connected to Chamber 1's opening that enables vapor entry into Chamber 1, a termination point of the vapor pathway is located under the water level of the solution, and the vapor will generate bubbles that percolate through the higher concentration solution. The movement of the bubbles encourages mixing of the solution in Chamber 1, thereby restoring the equilibrium.

Another aspect of an embodiment of the present invention is attempting to increase the effective surface area of a refrigerant and a desiccant with unique methods and devices. Methods utilized in conventional absorption refrigeration include atomized streams of fluid in the absorption chamber to generate a very large surface area, and applying very small solid desiccant spheroids to create large surface areas. However, the utilization of very small solid desiccant spheroids requires a secondary pumping apparatus and/or another apparatus to move heat efficiently from solid desiccants. Mixing the solution with bubbles solves this surface area problem by directly injecting vapors into the desiccant, wherein the vapors can be partially or completely absorbed by the desiccant as they move upward. Preferably, the bubbling is processed as quickly as possible because the desiccant can absorb the solution, and the timely mixing ensures a constant concentration of the solution.

The nested heat transfer system in accordance with an embodiment of the present invention enables the utilization of a much wider range of potential desiccants than what is feasible in conventional thermal energy transfer systems. Typically, conventional absorption-based thermal energy transfer systems are limited by their choices of desiccants. Only desiccants having a very high chemical activity can be practically used for domestic, commercial, or industrial tasks in conventional systems. In contrast, by creating a scalable thermal transfer system capable of linearly adding multiple independent entrochemical cells with nesting of chambers, the present invention can utilize a wide range of desiccants, including commonly-available and inexpensive desiccant materials.

Furthermore, in some embodiments of the invention, valves can be strategically positioned to allow liquid and vapor to flow into and out of both ends of each chamber, and also allow independent insertion of liquid directly into and independent removal of liquid directly out of each chamber in each entrochemical cell. In addition, vacuum can be applied in one end of a chain of entrochemical cells to allow easy removal of existing gas from the nested heat transfer system, as new gas is injected in the other end of the chain of entrochemical cells. The utilization of such valves and vacuum enables the nested heat transfer system to be maintained in a piecewise fashion, rather than requiring all maintenance to be completed on all parts of the system simultaneously. As a case in point, in one example, two parallel nested heat transfer systems can be operated without functional interruptions, even as liquids are recycled or vacuum is applied to a single entrochemical cell. Such an advantageous continuity of system operation is not realistically feasible with a conventional absorption refrigerator, unless substantial design complexities are introduced to the conventional absorption refrigerator.

Figure 1:
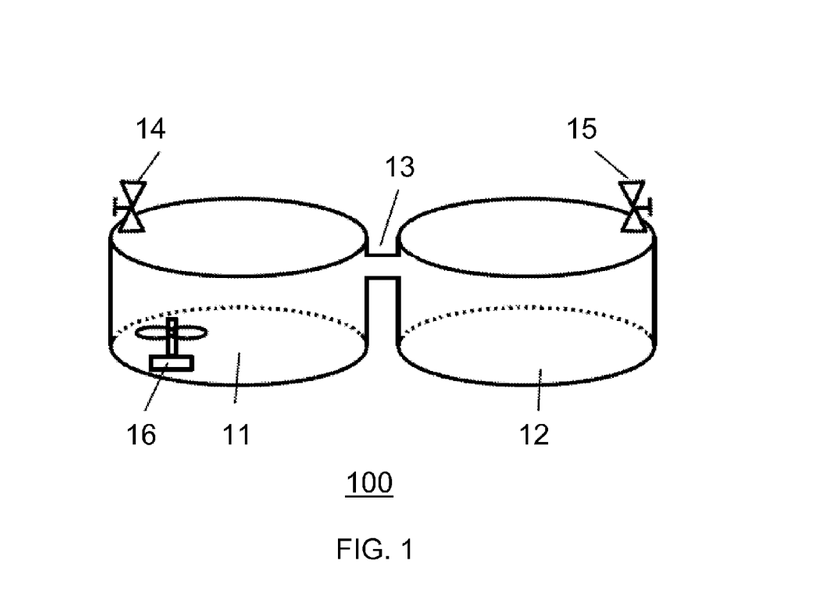
FIG. 1 shows a single enhanced entrochemical cell, in accordance with an embodiment of the invention.

FIG. 1 shows a single enhanced entrochemical cell (100), in accordance with an embodiment of the invention. The single enhanced entrochemical cell (100), as shown in FIG. 1, comprises a first chamber (11) and a second chamber (12) connected by a conduit (13). The first chamber (11) is "Chamber 1" that holds absorbent solution, and the second chamber (12) is "Chamber 2" that holds solvent, which may be less chemically active and/or less concentrated than the absorbent solution. As shown in FIG. 1, in one embodiment of the invention, a mixing apparatus (16) is also incorporated in the first chamber (11) and is configured to agitate the absorbent solution to maintain the uniformity of its higher concentration mixture.

Furthermore, in this embodiment of the invention, the single enhanced entrochemical cell (100) also incorporates a first valve (14) attached to a top surface of the first chamber (11), and a second valve (15) attached to a top surface of the second chamber (12). Liquid solutions can be inserted into or removed from each chamber through these valves (14, 15). When a vacuum is applied through one of these valves (14, 15), the valves can be closed to maintain vacuum conditions within the single enhanced entrochemical cell (100).

FIG. 2 shows two enhanced entrochemical cells (200) with a nested chamber structure (12, 21). The first enhanced entrochemical cell includes the first chamber (11) and the second chamber (12), as previously explained in FIG. 1, and a second enhanced entrochemical cell includes its own first chamber (21) and its own second chamber (22), as shown in FIG. 2. Furthermore, the nested chamber structure (12, 21) in FIG. 2 comprises the second chamber (12), or "Chamber 2," of the first enhanced entrochemical cell, and the first chamber (21), or "Chamber 1," of the second enhanced entrochemical cell.

Preferably, the structure of each enhanced entrochemical cell is identical or nearly identical to each other, with a smaller chamber of an enhanced entrochemical cell embedded or encapsulated into a larger chamber of an adjacent enhanced entrochemical cell to form the nested chamber structure (12, 21), as shown in FIG. 2. The second enhanced entrochemical cell in FIG. 2 also has a conduit (23), which connects the first chamber (21) and the second chamber (22) of the second enhanced entrochemical cell.

Furthermore, as shown in FIG. 2, a first set of valves (14, 15) are attached to corresponding chambers in the first enhanced entrochemical cell, and a second set of valves (24, 25) are attached to corresponding chambers in the second enhanced entrochemical cell. In addition, in this embodiment of the invention, a first mixing apparatus (16) is included in the first chamber (i.e. Chamber 1) (11) of the first enhanced entrochemical cell, and a second mixing apparatus (26) is included in the first chamber (i.e. Chamber 1) (21) of the second enhanced entrochemical cell, as shown in FIG. 2.

FIG. 3 shows three enhanced entrochemical cells (300) with two nested chamber structures. As also shown previously in FIG. 1 and FIG. 2, the first enhanced entrochemical cell includes the first chamber (11) and the second chamber (12). Similarly, as also shown previously in FIG. 2, the second enhanced entrochemical cell includes its own first chamber (21) and its own second chamber (22). Likewise, the third enhanced entrochemical cell in FIG. 3 includes its own first chamber (31) and its own second chamber (32). As an illustration of "chainable" nested chamber structure, which is a novel and unique aspect of the present invention, FIG. 3 also shows the first nested chamber structure comprising the second chamber (12) of the first enhanced entrochemical cell and the first chamber (21) of the second enhanced entrochemical cell, and the second nested chamber structure comprising the second chamber (22) of the second enhanced entrochemical cell and the first chamber (31) of the third enhanced entrochemical cell.

Preferably, in the three enhanced entrochemical cells (300) shown in FIG. 3, the structure of each enhanced entrochemical cell is identical or nearly identical to each other, with a smaller chamber of an enhanced entrochemical cell embedded or encapsulated into a larger chamber of an adjacent enhanced entrochemical cell to form the two nested chamber structures. In this embodiment of the invention, the first nested chamber structure comprises the second chamber (12) of the first enhanced entrochemical cell and the first chamber (21) of the second enhanced entrochemical cell, and the second nested chamber structure comprises the second chamber (22) of the second enhanced entrochemical cell and the first chamber (31) of the third enhanced entrochemical cell.

Each enhanced entrochemical cell has a conduit between its two chambers (i.e. between Chamber 1 and Chamber 2 per cell). Therefore, three conduits (13, 23, 33) are illustrated in FIG. 3 for the three enhanced entrochemical cells (300), with each conduit connecting two internal chambers per enhanced entrochemical cell. Furthermore, as shown in FIG. 3, a first set of valves (14, 15) are attached to corresponding chambers in the first enhanced entrochemical cell. Likewise, a second set of valves (24, 25) are attached to corresponding chambers in the second enhanced entrochemical cell. Similarly, a third set of valves (34, 35) are attached to corresponding chambers in the third enhanced entrochemical cell.

In addition, in this embodiment of the invention, a first mixing apparatus (16) is included in the first chamber (i.e. Chamber 1) (11) of the first enhanced entrochemical cell. Likewise, a second mixing apparatus (26) is included in the first chamber (i.e. Chamber 1) (21) of the second enhanced entrochemical cell. Similarly, a third mixing apparatus (36) is included in the first chamber (i.e. Chamber 1) (31) of the third enhanced entrochemical cell, as shown in FIG. 3.

FIG. 4 shows an n-cell long array of nested enhanced entrochemical cells (400), in accordance with an embodiment of the invention. As also shown previously in FIG. 1 and FIG. 2, the first enhanced entrochemical cell includes the first chamber (11) and the second chamber (12). A multiple number of enhanced entrochemical cells can be chained in an array, up to an n-th number of entrochemical cell, which in turn involves up to "n−1" number of nested chamber structures formed by "n" number of enhanced entrochemical cells, as shown in FIG. 4. As evidenced by the n-cell long array of nested enhanced entrochemical cells (400), the nested heat transfer system in accordance with an embodiment of the present invention is uniquely modular and scalable, unlike conventional thermal transfer systems.

For example, if the total number of enhanced entrochemical cells is 10 (i.e. n=10), there are 9 nested chamber structures (i.e. n−1) formed in the chain of the enhanced entrochemical cells, with each nested chamber structure formed by encapsulating or embedding a smaller chamber of an enhanced entrochemical cell in a larger chamber of an adjacent enhanced entrochemical cell, as shown in FIG. 4.

Accordingly, in this embodiment of the invention, a last enhanced entrochemical cell comprising two chambers (n1, n2), and a conduit connecting them (n3) is also shown in FIG. 4. Chamber 1 of an enhanced entrochemical cell "n" (i.e. "n1") is largely or completely embedded within Chamber 2 of an adjacent enhanced entrochemical cell "n−1" (i.e. "(n−1)2"). Furthermore, as also shown in FIG. 4, valves are attached to Chamber 1 of cell n (i.e. "n4") and Chamber 2 of cell n (i.e. "n5"). In addition, a mixing apparatus (i.e. "n6") is embedded in Chamber 1 (i.e. "n1") of cell n.

Figure 5:
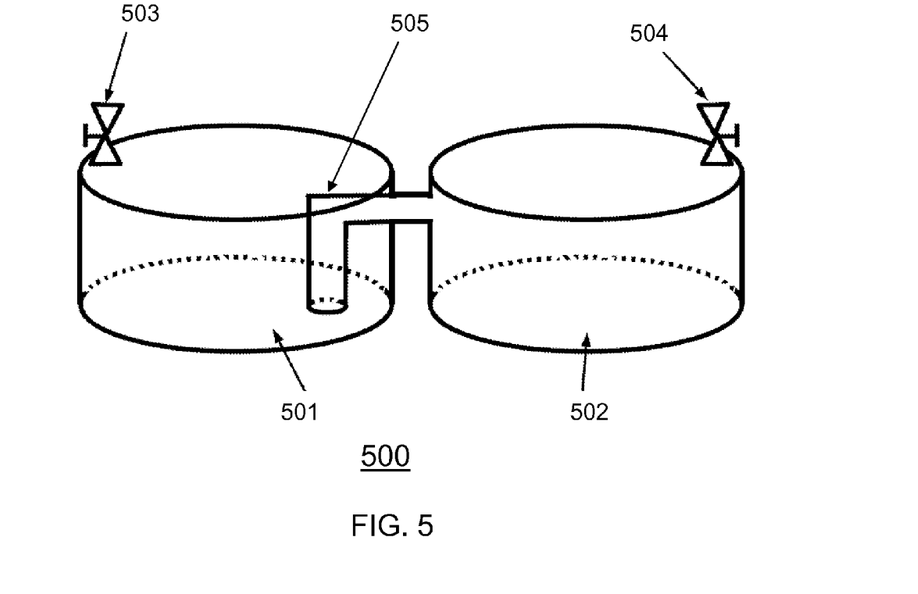
FIG. 5 shows a single enhanced entrochemical cell with a vertical tube that acts as a mixing apparatus, in accordance with an embodiment of the invention.

FIG. 5 shows a single enhanced entrochemical cell (500) with a vertical tube (505) that acts as a mixing apparatus, in accordance with an embodiment of the invention. In the embodiment of the invention as shown in FIG. 5, the single enhanced entrochemical cell (500), as shown in FIG. 5, comprises a first chamber (501) and a second chamber (502) connected by a conduit with the vertical tube (505). The first chamber (501) is "Chamber 1" that holds absorbent solution, and the second chamber (502) is "Chamber 2" that holds solvent, which may be less chemically active and/or less concentrated than the absorbent solution.

In this embodiment of the invention, the vertical tube (505) is connected to the first chamber (501) as a termination point of a vapor pathway between the first chamber (501) and the second chamber (502). The vertical tube (505) can function as a mixing apparatus, and is located lower than the surface level of the higher concentration solution in the first chamber (501) to generate bubbles that percolate through the higher concentration solution in the first chamber (501) for effective mixing and maintenance of concentration level.

Furthermore, in this embodiment of the invention, the single enhanced entrochemical cell (500) also incorporates a first valve (503) attached to a top surface of the first chamber (501), and a second valve (504) attached to a top surface of the second chamber (502). Liquid solutions can be inserted into or removed from each chamber through these valves (503, 504). When a vacuum is applied through one of these valves (503, 504), the valves can be closed to maintain vacuum conditions within the single enhanced entrochemical cell (500).

Figure 6:
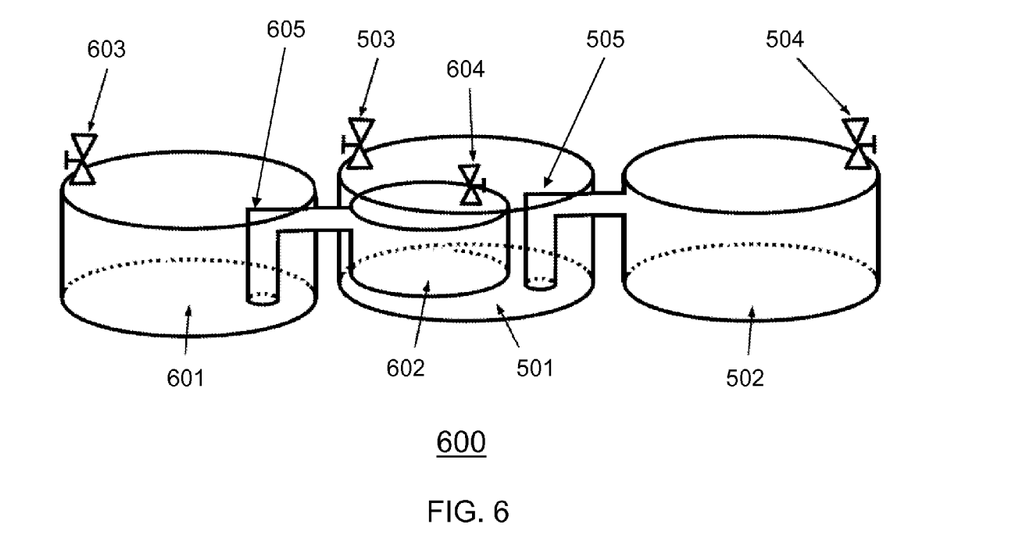
FIG. 6 shows two enhanced entrochemical cells with a pair of nested chambers and vertical tubes that act as mixing apparatuses, in accordance with an embodiment of the invention.

FIG. 6 shows two enhanced entrochemical cells (600) with a pair of nested chambers (602, 501) and vertical tubes (605, 505) that act as mixing apparatuses, in accordance with an embodiment of the invention. The first enhanced entrochemical cell includes the first chamber (501) and the second chamber (502), as previously explained in FIG. 5, and a second enhanced entrochemical cell includes its own first chamber (601) and its own second chamber (602), as shown in FIG. 6. Furthermore, the nested chamber structure (602, 501) in FIG. 6 comprises the second chamber (602), or "Chamber 2," of the second enhanced entrochemical cell, and the first chamber (501), or "Chamber 1," of the first enhanced entrochemical cell. Preferably, the structure of each enhanced entrochemical cell is identical or nearly identical to each other, with a smaller chamber of an enhanced entrochemical cell embedded or encapsulated into a larger chamber of an adjacent enhanced entrochemical cell to form the nested chamber structure (602, 501), as shown in FIG. 6.

In this embodiment of the invention, a first vertical tube (505) is connected to the first chamber (501) of the first enhanced entrochemical cell as a termination point of a vapor pathway between the first chamber (501) and the second chamber (502) of the first entrochemical cell. Similarly, a second vertical tube (605) is connected to the first chamber (601) of the second enhanced entrochemical cell as a termination point of a vapor pathway between the first chamber (601) and the second chamber (602) of the second entrochemical cell. Each vertical tube (505 or 605) can function as a mixing apparatus, and is located lower than the surface level of the higher concentration solution in each of the first chamber (501 or 601) to generate bubbles that percolate through the higher concentration solution in each of the first chamber (501 or 601) for effective mixing and maintenance of concentration level. Furthermore, as shown in FIG. 6, a first set of valves (503, 504) are attached to corresponding chambers in the first enhanced entrochemical cell, and a second set of valves (603, 604) are attached to corresponding chambers in the second enhanced entrochemical cell.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A nested heat transfer system comprising:
a first enhanced entrochemical cell that includes a first chamber containing a first set of higher concentration solution, a second chamber containing a first set of lower concentration solution, a first conduit connecting the first chamber and the second chamber, a first mixing apparatus configured to agitate the first set of higher concentration solution, and a first set of valves operatively connected to the first chamber and the second chamber; and
a second enhanced entrochemical cell that includes a third chamber containing a second set of higher concentration solution, a fourth chamber containing a second set of lower concentration solution, a second conduit connecting the third chamber and the fourth chamber, a second mixing apparatus configured to agitate the second set of higher concentration solution, and a second set of valves operatively connected to the third chamber and the fourth chamber, wherein the second chamber containing the first set of lower concentration solution at least partially encapsulates the third chamber containing the second set of higher concentration solution to form a nested structure, and wherein each enhanced entrochemical cell is individually hermetically sealed.

2. The nested heat transfer system of claim 1, wherein the first set of higher concentration solution is a desiccant for the first enhanced entrochemical cell, and the second set of higher concentration solution is a desiccant for the second enhanced entrochemical cell.

3. The nested heat transfer system of claim 1, wherein the first set of lower concentration solution is a refrigerant for the first enhanced entrochemical cell, and the second set of lower concentration solution is a refrigerant for the second enhanced entrochemical cell.

4. The nested heat transfer system of claim 1, wherein a total thermal gradient of the nested heat transfer system is an addition of a thermal gradient of the first enhanced entrochemical cell and a thermal gradient of the second enhanced entrochemical cell.

5. The nested heat transfer system of claim 1, further comprising a plurality of additional enhanced entrochemical cells operatively connected to the second enhanced entrochemical cell, wherein each additional enhanced entrochemical cell has a chamber encapsulating or encapsulated by another chamber from an adjacent enhanced entrochemical cell to form an additional nested structure.

6. The nested heat transfer system of claim 5, wherein a total thermal gradient of the nested heat transfer system is an addition of each thermal gradient provided by the first enhanced entrochemical cell, the second enhanced entrochemical cell, and the plurality of additional enhanced entrochemical cells operatively connected to the second enhanced entrochemical cell.

7. The nested heat transfer system of claim 1, wherein at least one of the first enhanced entrochemical cell and the second enhanced entrochemical cell is independently vacuum jacketed.

8. The nested heat transfer system of claim 1, wherein at least one of the first enhanced entrochemical cell and the second enhanced entrochemical cell is at least partially made of a thermally conducting material.

9. The nested heat transfer system of claim 1, wherein at least one of the first enhanced entrochemical cell and the second enhanced entrochemical cell contains or contacts a heat exchanger.

10. The nested heat transfer system of claim 1, wherein at least one of the first mixing apparatus and the second mixing apparatus utilizes a chamber interior-installed magnetic mixing bar and an externally-located magnetic mixing unit.

11. The nested heat transfer system of claim 1, wherein at least one of the first mixing apparatus and the second mixing apparatus utilizes a chamber-shaking apparatus that shakes at least one chamber periodically.

12. The nested heat transfer system of claim 1, wherein at least one of the first mixing apparatus and the second mixing apparatus utilizes a flotation device capable of floating the nested heat transfer system on water, in order to agitate the first set of higher concentration solution and the second set of higher concentration solution by water waves.

13. The nested heat transfer system of claim 1, further comprising a vertical tube connected to the first chamber as a termination point of a vapor pathway between the first chamber and the second chamber, wherein the vertical tube is located lower than the first set of higher concentration solution to generate bubbles that percolate through the first set of higher concentration solution for effective mixing and maintenance of concentration level in the first set of higher concentration solution.

14. The nested heat transfer system of claim 1, further comprising a vertical tube connected to the third chamber as a termination point of a vapor pathway between the third chamber and the fourth chamber, wherein the vertical tube is located lower than the second set of higher concentration solution to generate bubbles that percolate through the second set of higher concentration solution for effective mixing and maintenance of concentration level in the second set of higher concentration solution.

* * * * *